US008311821B2

(12) United States Patent
Breebaart et al.

(10) Patent No.: US 8,311,821 B2
(45) Date of Patent: Nov. 13, 2012

(54) PARAMETERIZED TEMPORAL FEATURE ANALYSIS

(75) Inventors: Dirk Jeroen Breebaart, Veldhoven (NL); Martin Franciscus McKinney, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1231 days.

(21) Appl. No.: 10/554,010

(22) PCT Filed: Apr. 21, 2004

(86) PCT No.: PCT/IB2004/050477
§ 371 (c)(1),
(2), (4) Date: Oct. 21, 2005

(87) PCT Pub. No.: WO2004/095315
PCT Pub. Date: Nov. 4, 2004

(65) Prior Publication Data
US 2006/0196337 A1    Sep. 7, 2006

(30) Foreign Application Priority Data
Apr. 24, 2003 (EP) .................................. 03101146

(51) Int. Cl.
*G10L 19/14* (2006.01)
*G10L 15/00* (2006.01)
*G10L 19/00* (2006.01)
(52) U.S. Cl. ...................... 704/234; 704/231; 704/200.1
(58) Field of Classification Search .................. 704/200, 704/503, 234
See application file for complete search history.

(56) References Cited

U.S. PATENT DOCUMENTS

| 4,843,562 | A |   | 6/1989  | Kenyon et al. |
|-----------|---|---|---------|----------------------------|
| 5,581,658 | A | * | 12/1996 | O'Hagan et al. ....... 706/20 |
| 5,701,391 | A | * | 12/1997 | Pan et al. ........... 704/212 |
| 5,899,969 | A | * | 5/1999  | Fielder et al. ........ 704/225 |
| 5,918,223 | A |   | 6/1999  | Keislar et al. |
| 6,570,991 | B1| * | 5/2003  | Scheirer et al. ....... 381/110 |
| 7,028,325 | B1| * | 4/2006  | Rui et al. ............ 725/37 |
| 2002/0087565 | A1 | | 7/2002 | Hoekman et al. |
| 2003/0040904 | A1 | | 2/2003 | Whitman et al. |

FOREIGN PATENT DOCUMENTS

| EP | 0735754 A2 | 10/1996 |
|----|------------|---------|
| EP | 1260968 A1 | 11/2002 |
| EP | 1260968 B1 | 11/2002 |

OTHER PUBLICATIONS

G. Tzanetakis et al. "Automatic Musical Genre Classification of Audio Signals", International Symposium on Music Information Retrieval, (ISMIR), Bloomington, Indiana, 2001.*

(Continued)

*Primary Examiner* — Jesse Pullias

(57) ABSTRACT

A method (1) for classifying at least one audio signal (A) into at least one audio class (AC), the method (1) comprising the steps of analyzing (10) said audio signal to extract at least one predetermined audio feature, performing (12) a frequency analysis on a set of values of said audio feature at different time instances, deriving (12) at least one further audio feature representing a temporal behavior of said audio feature based on said frequency analysis, and classifying (14) said audio signal based on said further audio feature. With the further audio feature, information is obtained about the temporal fluctuation of an audio feature, which may be advantageous for a classification of audio.

11 Claims, 2 Drawing Sheets

OTHER PUBLICATIONS

Scheirer et al. "Construction and Evaluation of a Robust Multifeature Speech/Music Discriminator". Proceedings of the 1997 IEEE International Conference on Acoustics, Speech, and Signal Processing (ICASSP '97), vol. 2, p. 1131-1134).*

Repp, Bruno H. "Quantitative Effects of Global Tempo on Expressive Timing in Music Performance: Some Perceptual Evidence". Music Perception, Fall 1995, vol. 13 No. 1, p. 39-57.*

Gray et al. "Design of Moving Average Trend Filters using Fidelity, Smoothness and Minimum Revisions Criteria". Statistical Research Report Series No. RR96/01, Institute of Statistics and Operations Research, Victoria University of Wellington, New Zealand, 1997.*

Allegro et al. "Automatic Sound Classification Inspired by Auditory Scene Analysis". in Proc. Eur. Conf. Sig. Proc. (EURASIP), 2001.*

Dau et al. "Modeling Auditory Processing of Amplitude Modulation. I. Detection and Masking with Narrow-band Carriers". J. Acoust. Soc. Am. 102 (5), Pt. 1, Nov. 1997.*

Erling Wold et al: Content-Based Classification Search and Retrieval of Audio, IEEE vol. 3, No. 3, 1996, pp. 27-36, XP002154735.

G. Von Bismarck, Sharpness as an Attribute of the Timbre of Steady Sounds, Acustica 1974, vol. 30, pp. 159-172.

Counter-based classification search and retrieval of audio in IEEE Multimedia, Fall: 27-36, 1996, by E. Wold et al.

"Sharpness as an attribute of the timbre of steady sound" in Acustica 30:159-172, 1974.

Torsten Dau et al; "Modeling Auditory Processing of Amplitude Modulation.I. Detection and Masking With Narrow-Band Carriers", J. Acoust. Soc. Am. vol. 102, No. 5, Nov. 1, 1997, pp. 2892-2905.

Silvia Allegro et al; "Automatic Sound Classification Inspired by Auditory Scene Analysis", Signal Processing Dept., Phonak AG, Switzerland.

Alistair Gray et al; "Design of Moving-Average Trend Filters Using Fidelity, Smoothness and Minimum Revisions Criteria", Inst. of Statistics and Operations Research, Victoria Univ. of Wellingtong, Feb. 7, 1997, pp. 1-3.

Bruno H. Repp; "Quantitative Effects of Global Tempo on Expressive Timing in Musci Performance: Some Perceptual Evidence", Music Perception, vol. 13, No. 1, Fall 1995, pp. 39-57.

Eric Scheirer et al; Construction and Evaluation of a Robust Multifeature Speech/Music Discriminator, Interval Research Corp, Palo Alto, CA, 1997 IEEE.

George Tzanetakis et al; "Automatic Musical Genre Classification of Audio Signals", Computer Science Dept. Princeton, NJ.

* cited by examiner

PARAMETERIZED TEMPORAL FEATURE ANALYSIS

The invention relates to classifying at least one audio signal into at least one audio class.

Developments in Internet and broadcast technology enable users to enjoy large amounts of multimedia content. With this rapidly increasing amount of data, users require automatic methods to filter, process and store incoming data. Some of these functions will be aided by attached metadata that provides information about the content. However, due to the fact that metadata is sometimes not provided, not precise enough, or even inaccurate, and because local processing power has increased tremendously, interest in local automatic multimedia analysis has increased. The multimedia analysis may comprise an automatic classification of an audio signal. In the automatic classification of an audio signal, low-level signal features are mapped to a semantic meaning, i.e. a classification of the analyzed audio content. By way of example and not limitation, the classification may be a discrimination between music, speech, background noise, or silence. Also other classifications are possible, such as musical genre classification, automatic detection of particular audio highlights or automatic speaker recognition. The classification of audio usually comprises two stages. The first stage analyzes the incoming waveform and extracts at least one audio feature that gives information about a predetermined property of the audio signal. The feature extraction process usually involves a large information reduction. The second stage performs a classification based on the extracted audio features.

E. Wold et al. presented a number of audio features that can be used for an audio classification in "Content-based classification, search and retrieval of audio" in IEEE Multimedia, Fall: 27-36, 1996. These audio features are loudness, pitch, brightness and bandwidth of an audio signal. The audio features may vary over time, which results in so called trajectories of the audio features. In order to obtain information about the feature trajectories, i.e. the temporal fluctuation of an audio feature, a number of further audio features are introduced. These further audio features comprise the average value of an audio feature over a feature trajectory, the variance of an audio feature over a feature trajectory, and the autocorrelation of an audio feature over a feature trajectory at a small lag.

It is an object of the present invention to obtain information about the temporal fluctuation of an audio feature in an advantageous manner. To this end, the invention provides a method, a system, a music system, a multi-media system and a medium as specified in the independent claims. Advantageous embodiments are defined in the dependent claims.

According to an aspect of the invention, to obtain information about the temporal behavior of an audio feature, a further audio feature is introduced which is based on a frequency analysis performed on a set of values of said audio feature at different time instances. The invention is based on the insight that, although the average and the variance of an audio feature over time does provide information about the temporal fluctuation of an audio feature, it does not provide any information about the temporal fluctuation velocity of the audio feature. Moreover, the average and the variance of an audio feature are usually correlated. For example, if a signal is scaled by a factor of two, both the average and the standard deviation of the short-term energy scale with the same factor. Most classification algorithms work more efficiently if the analyzed audio features are uncorrelated. Next, the autocorrelation of an audio feature introduced in Wold et al. may be a measure of whether or not an audio feature is changing over time and whether or not it is periodic. However, the autocorrelation does not give a detailed description of the temporal behavior of an audio feature. The autocorrelation may give an indication of how fast an audio feature is varying in time, but this indication is averaged over the whole signal. Therefore, using the autocorrelation of an audio feature is only giving limited information about the temporal fluctuation of an audio feature. Using a further audio feature according to the invention solves at least one of the disadvantages stated above.

According to a further aspect of the invention, the audio feature that serves as an input for the frequency analysis may be at least one audio feature that is known in the art. By way of example and not limitation, an audio feature can be chosen from a plurality of audio features, such as a root-mean-square (RMS) level, a spectral centroid, a bandwidth, a zero-crossing rate, a spectral roll-off frequency, a band energy ratio, a delta spectrum magnitude, a pitch and a pitch strength. These audio features are commonly used features that are known in the art. An advantage of using these audio features is that it is relatively simple to calculate them which is advantageous for the required computational load. A further possibility to choose an audio feature is to use at least one mel-frequency cepstral coefficient (WCC). MFCC coefficients represent a parameterized description of the amplitude spectrum of an audio signal. An MFCC coefficient is used in audio classification algorithms due to its compactness, i.e. MFCC coefficients are able to represent the spectral envelope with only a few parameters. Furthermore, the MFCC coefficients are approximately uncorrelated for speech signals and music. Also, except for the zeroth MFCC coefficient, which is a function of the overall signal level, the remaining coefficients do not depend on the input level, i.e. they are gain independent. A still further possibility to choose an audio feature, is to use common known psycho-acoustic features. By way of example and not limitation, these features can be the loudness and sharpness of an audio signal. Loudness is the sensation of intensity and sharpness is a perception related to the spectral density and the relative strength of high-frequency energy. Choosing these features for obtaining the further audio features may be advantageous as the psycho-acoustic features are related to a human's perception of audio.

In an embodiment of the invention, in order to derive the further audio feature, an average (DC) value is calculated of a set of values of an audio feature at different time instances, at least one frequency band is defined, the amount of energy within said frequency band is calculated from said frequency analysis; and said further audio feature is defined as said amount of energy in dependence on said average (DC) value. An advantage of using a frequency band is that this frequency band may be chosen to correspond to a specific perceptual phenomena that may be important for audio classification. For example, speech signals contain prominent envelope modulations in the range of 3-15 Hz, which range corresponds to the syllabic rate. Other audio signals, such as music audio signals, have relatively fewer modulations in this range. Therefore, if speech audio signals need to be classified, it may be advantageous to use a further audio feature representing the amount of envelope modulation in the range of 3-15 Hz. Furthermore, envelope modulations in the 20-150 Hz range are perceived as roughness, i.e. musical dissonance. Therefore, in order to distinguish dissonant or rough sounds from consonant or smooth sounds, it may be advantageous to use a further audio feature representing the amount of envelope modulation in the range of 20-150 Hz. Next, envelope modulations at very low frequencies, for example in the range of 1-2 Hz are perceived as changes in loudness. Therefore, in order to distinguish sounds with different rates of loudness changes, it is advantageous to use a further audio feature representing the amount of envelope modulation in the range of 1-2 Hz. Also, musical tempo information is represented in the range of 1-2 Hz. It is noted that above mentioned frequency bands are given by way of example and not limitation. Other frequency bands may be chosen without departing from the scope of the invention. It is further noted that the frequency bands may be overlapping and may vary in time possibly in dependence on the audio signal, processing results, other external or internal parameters, or a combination thereof.

In a further embodiment of the invention the further audio feature is determined by deriving at least one coefficient by performing a discrete cosine transformation (DCT) on the result of said frequency analysis. An advantage of using at least one DCT coefficient is that they are independent of the signal level. Furthermore, DCT coefficients may be highly uncorrelated which may be advantageous for audio classification. Also, with an increasing number of DCT coefficients, more details of the result of the frequency analysis are covered. In that manner, one can choose the detail level in combination with the resulting processing load.

The aforementioned and other aspects of the invention will be apparent from and elucidated with reference to the embodiments described hereinafter.

Figure 1:
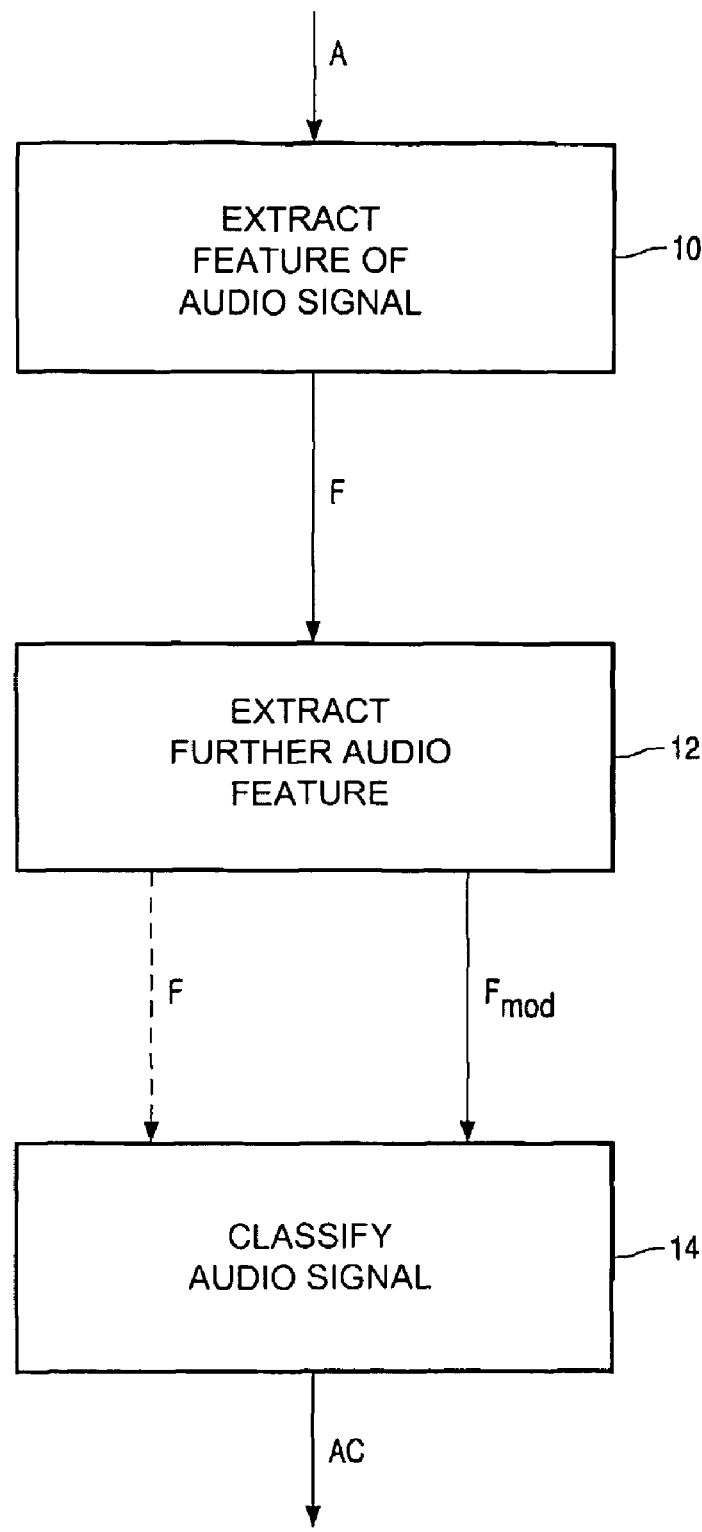
FIG. 1 shows a block diagram representing an embodiment of the method of classifying an audio signal according to the invention.

FIG. 1 shows a block diagram 1 representing an embodiment of the process of classifying an audio signal according to the invention. As an input of the process, an audio signal A is used. The audio signal A may be a frame of PCM samples $x[n]$ of length $N_1$. The audio signal A serves as an input for a feature extraction step 10. In the feature extraction step 10, at least one predetermined audio feature F is determined. A possibility is that the extracted audio feature F is at least one from the following audio features, i.e. a root-mean-square (RMS) level, a spectral centroid, a bandwidth, a zero-crossing rate, a spectral roll-off frequency, a band energy ratio, a delta spectrum magnitude, a pitch and a pitch strength. The RMS level of an audio frame of length N can be calculated as:

$$RMS = \sqrt{\frac{1}{N} \sum_{n=0}^{N-1} x[n]^2} \qquad (1)$$

A spectral centroid is based on a power spectrum $P[k]$ of the audio signal A. The power spectrum $P[k]$ may be obtained by an FFT operation:

$$P[k] = \left\| \frac{1}{N} \sum_{n=0}^{N-1} x[n] \exp(2\pi kn/N) \right\|^2 \qquad (2)$$

where k is the number of the power spectrum bin, which relates to the frequency f according to $$f[k] = \frac{k f_s}{N} \qquad (3)$$

where $f_s$ is the sampling rate of the input signal. The spectral centroid $S_f$ may be defined as the center of mass of the power spectrum $P[k]$:

$$S_f = \frac{\sum_k f[k] P[k]}{\sum_k P[k]} \qquad (4)$$

The bandwidth $B_f$ of the power spectrum $P[k]$ may be defined by:

$$B_f = \sqrt{\frac{\sum_k (f[k] - S_f)^2 P[k]}{\sum_k P[k]}} \qquad (5)$$

A zero crossing rate $R_z$ may be defined as the number of zero crossings of an audio signal A occurring in a predetermined time frame, for example the number of zero crossings per second. The spectral roll-off frequency $f_r$ may be defined as the frequency for which the energy below that frequency is a predetermined proportion $p(0<p<1)$ of the total signal energy:

$$f_r = f \left[ \max_q \left( \sum_{k=0}^{q} P[k] < p \sum_{k=0}^{N/2} P[k] \right) \right] \qquad (6)$$

The band-energy ratio $B_r$ may be defined as the relative amount of energy present in a predetermined frequency range $f_1$-$f_2$ Hz:

$$B_r = \frac{\sum_{k[f=f_1]}^{k[f=f_2]} P[k]}{\sum_k P[k]} \qquad (7)$$

The delta spectrum magnitudes is a correlate of the change in the spectrum. If two subsequent time-frames have (normalized) power spectra $P_i[k]$ and $P_{i+1}[k]$, then the delta spectrum magnitude may be defined by:

$$f_d = \sqrt{\frac{2}{N} \sum_k \left( \sqrt{P_i[k]} - \sqrt{P_{i+1}[k]} \right)^2} \qquad (8)$$

The pitch T may be calculated by taking the maximum in the autocorrelation function within a limited range of delays. The pitch strength S may be defined as the height of the maximum peak in the normalized autocorrelation function corresponding to the pitch value.

Next to extracting above mentioned audio features, the extracted audio feature F may also be at least one mel-frequency cepstral coefficient (MFCC). For determining a MFCC coefficient, for a given audio frame x[n], with $0 \leq n \leq N-1$, the power spectrum can be computed for example by taking a Fourier transform of x[n], resulting in X[k]:

$$X[k] = \frac{1}{N}\sum_{n=0}^{N-1} x[n]\, h[n]\, e^{(-2\pi jkn)/N} \qquad (9)$$

where h[n] denotes a temporal window. An example of such a window is a Hanning window which is known in the art. The amplitude spectrum |X[k]| of X[k] is multiplied by a set of filter kernels. The center frequencies of these filters have a constant separation on a mel-frequency scale $f_m$ in dependence on the frequency f which may be defined by:

$$f_m = 2595 \log_{10}(1 + f/700) \qquad (10)$$

The input spectrum is converted to a mel-frequency spectrum using a filterbank with $k_n$ triangularly-shaped filters G[k, $k_n$] with a spacing and a bandwidth that is, linearly spaced on the mel-frequency scale. The mel-frequency cepstrum is then given by the logarithm of the inner product of the filter kernel and the amplitude spectrum:

$$C[k_n] = \log_{10}(\Sigma |X[k]|\, G[k, k_n]) \qquad (11)$$

In order to obtain the mel-frequency cepstrum coefficients (MFCC) c[n], the discrete cosine transform of the mel-frequency spectrum is computed:

$$c[n] = \sum_{k_m}^{K} C[k_m] \cos[n(k_m - 1/2)\pi/K] \qquad (12)$$

A further possibility to choose an extracted audio feature F is to use at least one psycho-acoustic (PA) audio feature, such as loudness or sharpness of an audio signal. An example of defining loudness is presented by Eberhard Zwicker et al. in "*Psychoacoustics: Facts and Models*", volume 22 of *Springer series on information sciences*, Springer-Verlag, Berlin, $2^{nd}$ edition, 1999. An example of defining sharpness is given in "*Sharpness as an attribute of the timbre of steady sounds*" in *Acustica*, 30:159-172, 1974. A plurality of methods are known in the art are known to extract psycho-acoustic features, that may be chosen for obtaining the further audio feature according to the invention.

The further audio feature is obtained in a further audio feature extraction step 12. In the further feature extraction step 12, a set of values of an audio feature F at different time instances is defined. Possibly, sets of values may have a fixed size or may be variable. Also, sets of values may be overlapping. Next, a frequency analysis is performed on the set of values F(t) of an audio feature F in time t=[0 . . . T], which results in a feature log power spectrum $|F(f)|^2$:

$$|F(f)|^2 = \left| \int_0^T F(t) \exp(-2\pi i f t)\, dt \right|^2 \qquad (13)$$

In order to parameterize the feature log power spectrum, the frequency axis of the power spectrum is summarized by summing the energy within at least one predetermined frequency band. The summing may also be a weighted sum of energies, for example in dependence on frequency or in dependence on the energy itself. By way of example and not limitation, the predetermined frequency band can be at least one of the frequency bands 1-2 Hz, 3-15 Hz, and 20-150 Hz. The 1-2 Hz frequency band may be preferable to distinguish sounds with different rates of loudness changes as envelope modulations at very low frequencies are perceived as changes in loudness. Also musical tempo information is available from this frequency range. The 3-15 Hz frequency band may be preferable for classifying speech signals which contain prominent envelope modulations in the range of 3-15 Hz, which range corresponds to the syllabic rate. Other audio signals, such as music audio signals, have relatively fewer modulations in this range. The 20-150 Hz frequency band may be preferable to distinguish dissonant or rough sounds from consonant or smooth sounds as envelope modulations in the 20-150 Hz range are perceived as roughness, i.e. musical dissonance. Finally, the amount of energy within a predetermined frequency band may be divided by the average (DC) of subsequent values of the audio feature (i.e., subsequent values alone, not including preceding values) to yield a relative modulation depth. The average may be obtained by evaluating the 0 Hz energy in the feature power spectrum |F|. The result of this calculation is a further audio feature $F_{mod}$ that can be used for classifying an audio signal. Another method to parameterize the feature log power spectrum is to transform the log-power spectrum $|F(f)|^2$ into at least one coefficient C(m) using a discrete cosine transformation (DCT):

$$C(m) = \int_{f_a}^{f_b} \cos\left(\frac{(f - f_a)\pi m}{f_b - f_a}\right) \log \frac{|F(f)|^2}{|F(0)|^2}\, df \qquad (14)$$

in which $f_a$ and $f_b$ denotes the start and end frequency of a frequency band of interest. Usually, the upper frequency $f_b$ is half the sampling frequency of $f_s$. Now, the coefficient C(m) is used as a further audio feature $F_{mod}$. C(0) denotes the total amount of modulations averages on a log scale, hence C(0) is related to the overall modulation depth. Due to the division of $|F(x)|^2$ by $|F(0)|^2$ the modulation depth parameter is independent of the signal level. Furthermore, it is noted that DCT coefficients may be highly uncorrelated which may be advantageous for audio classification. Also, it is noted that with an increasing number m of coefficients C(m), more details of the feature log-power spectrum $|F(f)|^2$ are covered.

The classification of an audio signal is performed in the audio classification step 14. Various methods of classifying audio based on audio features are known in the art. Any of these methods may be used in the audio classification step 14, now using a further audio feature $F_{mod}$, possibly in combination with an audio feature F derived in the feature extraction step 10. By way of example and not limitation, the audio classification step 14 comprises at least one of multivariate Gaussian models, Gaussion mixture models, self-organizing maps, neural networks, k-nearest neighbor schemes and hidden Markov models. These audio classification methods are known in the art and it goes beyond the scope of the invention to discuss them in detail. The result of the classification step 14 is at least one audio class AC. It is noted that the classification of audio may also comprise similarity measurements, e.g. finding similar music. The classification may further comprise a segmentation procedure, e.g. identifying scene changes using audio feautures.

Figure 2:
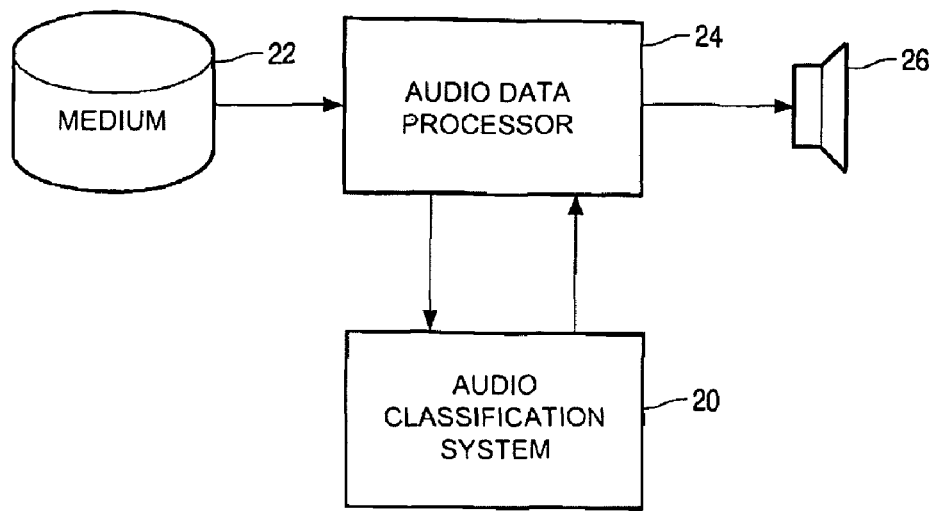
FIG. 2 shows an embodiment of a music system according to the invention.

FIG. 2 shows an embodiment of a music system 2 according to the invention. The music system 2 comprises a medium 22 comprising audio data. The medium 22 may be a removable medium such as a Compact Disk or may be incorporated in the music system 2, for example a hard-disk incorporated in the system. The music system may denote an audio receiver. In that case, the medium 22 is at another location and the audio data is broadcasted to the audio receiver, for example by radio, internet, or satellite. The medium 22 may also be an audio data generating device such as a microphone or a musical instrument. The audio data is transferred to an audio data processing device 24. The audio data processing device 24 may comprise an audio amplifier and may further comprise audio processing means for adapting the audio data and control means for controlling an audio classification process. The resulting signal from the audio data processing device 24 is transferred to a sound generating device 26 such as a speaker. The music system 2 further comprises an audio classification system 20. The audio classification system extracts features from the audio data according to the invention and classifies the audio data into at least one predetermined audio class. The audio data may be obtained from the audio data processing device 24 or may be obtained directly from the medium 22. The resulting audio class or classes are transferred to the audio data processing device 24 for further processing. For example, based on the audio class the audio data can be played or not, or based on the audio class information may be given to the user about the content it is listening to. The features used for classification may be available from a signal accompanying the audio data, the signal comprising at least one further audio feature which is obtained according to the invention. When the music system 2 denotes an audio receiver, the audio receiver may further comprise means to receive a signal comprising at least one further audio feature which is obtained according to the invention, which further audio feature may be used for a classification.

Figure 3:
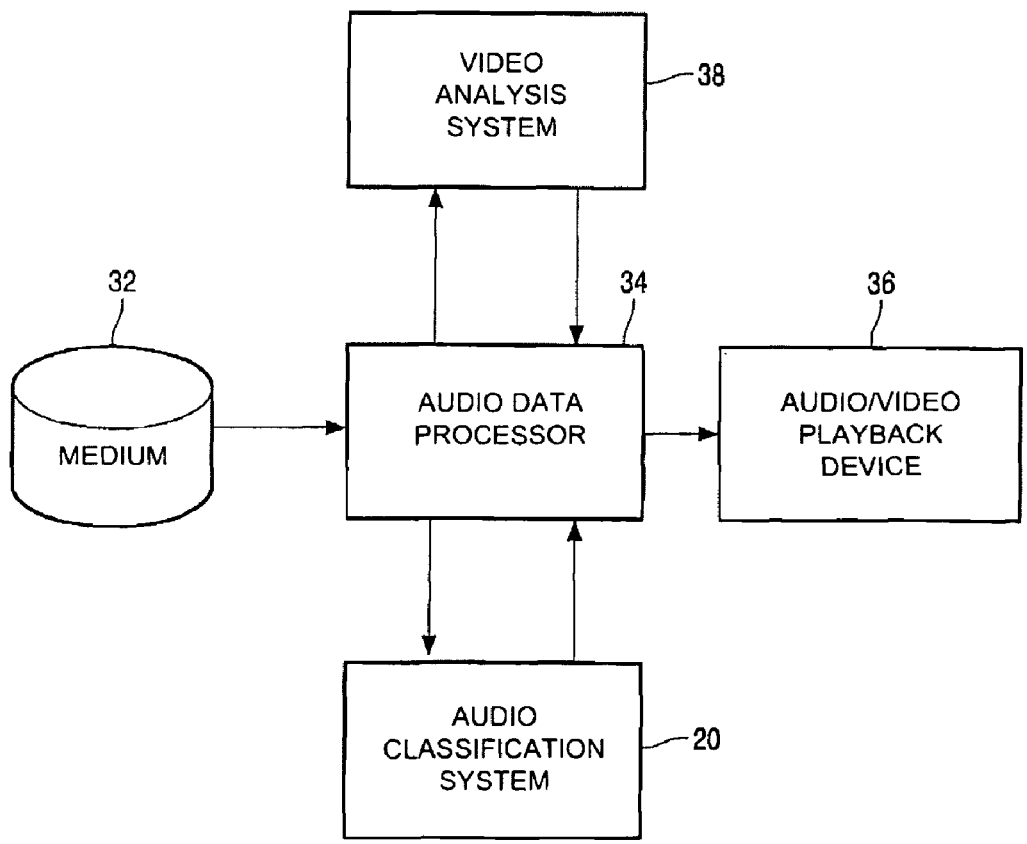
FIG. 3 shows an embodiment of a multi-media system according to the invention.

FIG. 3 shows an embodiment of a multi-media system 3 according to the invention. The multi-media system 3 comprises a medium 32 comprising audio and video data. There may be different mediums containing either audio or video data. The medium may be a removable medium, or may be incorporated in the system 3 or may be available via broadcasting. The audio and video data is transferred to an audio and video processing device 34. The audio and video processing device 34 comprises means to process the audio and video for playing the audio and video data on an audio and video playing device 36. The audio and video playing device 36 may for example be a television, a monitor or a projector. The audio and video playing device 36 may be incorporated in the system 3 but this is not necessary. The audio and video processing device 34 may further comprise control means to control a video analysis system 38. The video analysis system 38 is capable of analyzing the video data obtained either directly from the medium 32 or from the audio and video processing device 34. By way of example and not limitation, the video analysis system 38 may comprise a video decoder for decoding video data that is available in compressed form, e.g. an MPEG decoder, a commercial block detector, a movie detector or a video classification system, which examples are known in the art. Results of the video analysis system 38 are transferred to the audio and video processing device 34. The audio and video processing device 34 may further comprise means to control an audio classification system 20. The audio classification system 20 functions in the same way as in the music system 2. Furthermore, the audio and video processing device 34 may comprise means to combine the results from the video analysis system 38 and the audio classification system 20. For example, when a movie is detected by the video analysis system 38, the audio classification system 20 may classify speech in the movie into a class of speech from a certain actor that plays in the movie.

It should be noted that the above-mentioned embodiments illustrate rather than limit the invention, and that those skilled in the art will be able to design many alternative embodiments without departing from the scope of the appended claims. In the claims, any reference signs between parenthesis shall not be construed as limiting the claim. The word 'compromising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for classifying at least one audio signal into at least one audio class, the method comprising the steps of:
   analyzing said audio signal to extract at least one predetermined audio feature;
   performing a frequency analysis on a set of values of said extracted predetermined audio feature at different time instances resulting in a power spectrum of said extracted predetermined audio feature;
   deriving at least one further audio feature representing a temporal behavior of said extracted predetermined audio feature by parameterizing said power spectrum, wherein parameterizing said power spectrum comprises (a) summarizing a frequency axis of the power spectrum by summing energy within at least one predetermined frequency band and (b) dividing (b)(i) the summed energy within the at least one predetermined frequency band by (b)(ii) an average of subsequent values alone of said extracted predetermined audio feature, not including preceding values, to (c) yield a relative modulation depth representing an amount of envelope modulation in the at least one predetermined frequency band; and
   classifying said audio signal based on said further audio feature.

2. The method as claimed in claim 1, wherein said at least one predetermined audio feature comprises at least one of the following audio features:
   root-mean-square level;
   spectral centroid;
   bandwidth;
   zero-crossing rate;
   spectral roll-off frequency;
   band energy ratio;
   delta spectrum magnitude;
   pitch; and
   pitch strength.

3. The method as claimed in claim 1, wherein said predetermined audio feature comprises at least one mel-frequency cepstral coefficient.

4. The method as claimed in claim 1, wherein said predetermined audio feature comprises at least one of the psycho-acoustic audio features loudness and sharpness.

5. The method as claimed in claim 1, wherein said deriving step comprises the steps of:
   calculating an average value of said set of values of said extracted predetermined audio feature at different time instances;
   defining at least one frequency band;
   calculating the amount of energy within said frequency band from said frequency analysis; and
   defining said further audio feature as said amount of energy divided by said average value.

6. The method as claimed in claim 5, wherein at least one of the following modulation frequency bands are used in said parameterizing said power spectrum:
1-2 Hz;
3-15 Hz; and
20-150 Hz.

7. The method as claimed in claim 1, wherein said at least one further audio feature is defined as at least one coefficient obtained by performing a discrete cosine transformation on the result of said frequency analysis.

8. The method as claimed in claim 1, wherein performing a frequency analysis on a set of values of said extracted predetermined audio feature at different time instances results in a log power spectrum of said extracted predetermined audio feature.

9. A system for classifying at least one audio signal into at least one audio class, the system comprising:
  means for analyzing said audio signal to extract at least one predetermined audio feature;
  means for performing a frequency analysis on a set of values of said extracted predetermined audio feature at different time instances resulting in a power spectrum of said extracted predetermined audio feature;
  means for deriving at least one further audio feature representing a temporal behavior of said extracted predetermined audio feature by parameterizing said power spectrum, wherein parameterizing said power spectrum comprises (a) summarizing a frequency axis of the power spectrum by summing energy within at least one predetermined frequency band and (b) dividing (b)(i) the summed energy within the at least one predetermined frequency band by (b)(ii) an average of subsequent values alone of said extracted predetermined audio feature, not including preceding values, to (c) yield a relative modulation depth representing an amount of envelope modulation in the at least one predetermined frequency band; and
  means for classifying said audio signal based on said further audio feature.

10. A music system comprising:
  means for playing audio data from a medium; and
  a system as claimed in claim 9 for classifying said audio data.

11. A multi-media system comprising:
  means for playing audio data from a medium;
  a system as claimed in claim 9 for classifying said audio data;
  means for displaying video data from a further medium;
  means for analyzing said video data; and
  means for combining the results obtained from analyzing said video data with the results obtained from classifying said audio data.

* * * * *